(12) United States Patent
Mathis et al.

(10) Patent No.: US 7,755,761 B2
(45) Date of Patent: Jul. 13, 2010

(54) SELF-NORMALIZING CONTOUR DRILLING MACHINE

(75) Inventors: Dennis R. Mathis, Tulsa, OK (US); Theodore K. Vogt, Claremore, OK (US); Patrick N. Shay, Tulsa, OK (US); Dana B. Jackson, Broken Arrow, OK (US)

(73) Assignee: The Boeing Company, Chicago, IL (US)

( * ) Notice: Subject to any disclaimer, the term of this patent is extended or adjusted under 35 U.S.C. 154(b) by 726 days.

(21) Appl. No.: 10/987,826

(22) Filed: Nov. 12, 2004

(65) Prior Publication Data

US 2006/0104734 A1    May 18, 2006

(51) Int. Cl.
*G01B 11/00*    (2006.01)
(52) U.S. Cl. .................. 356/399; 356/614; 356/615; 700/160; 250/599.3
(58) Field of Classification Search .................. 356/399, 356/614–615, 138; 408/79; 250/559.33; 700/160
See application file for complete search history.

(56) References Cited

U.S. PATENT DOCUMENTS

| | | | | |
|---|---|---|---|---|
| 5,031,203 A | * | 7/1991 | Trecha | 378/205 |
| 5,426,687 A | * | 6/1995 | Goodall et al. | 378/206 |
| 5,741,096 A | * | 4/1998 | Olds | 408/1 R |
| 6,472,676 B1 | * | 10/2002 | Douglas et al. | 250/559.33 |
| 6,514,018 B2 | | 2/2003 | Martinez et al. | |
| 6,921,235 B2 | * | 7/2005 | Chen | 408/16 |
| 6,927,560 B2 | | 8/2005 | Pedigo et al. | |
| 6,937,336 B2 | * | 8/2005 | Garcia et al. | 356/399 |
| 7,083,366 B2 | * | 8/2006 | Tung | 408/16 |
| 7,164,474 B2 | * | 1/2007 | Arntson et al. | 356/154 |
| 7,369,916 B2 | * | 5/2008 | Etter et al. | 700/160 |
| 2003/0108395 A1 | * | 6/2003 | Douglas et al. | 408/76 |
| 2007/0036618 A1 | | 2/2007 | Fritsche et al. | |

* cited by examiner

*Primary Examiner*—Tarifur R. Chowdhury
*Assistant Examiner*—Isiaka O Akanbi
(74) *Attorney, Agent, or Firm*—Harness, Dickey & Pierce, P.L.C.

(57) ABSTRACT

A self-normalizing contour surface drilling apparatus drills holes into contour surfaces with the drill bit of the apparatus oriented normally to the contour surface. The apparatus first determines a location of a hole to be drilled and the orientation of the drill bit relative to the surface at the hole location, and adjusts the position of the drill bit so that the drill bit is positioned normally to the hole location. The apparatus then drills the hole at the location, and then repeats the process seeking out the next location for a drilled hole.

14 Claims, 8 Drawing Sheets

SELF-NORMALIZING CONTOUR DRILLING MACHINE

BACKGROUND

1. Field

The present disclosure pertains to a drilling machine that drills holes into contour surfaces with the drill bit of the machine oriented normally to the contour surface. More specifically, the present disclosure pertains to a drilling machine that automatically orients a drill bit in normal orientation to and maintains elevation to a contour surface of an object to be drilled prior to activation of the drilling operation.

2. Description of the Related Art

In large scale manufacturing, for example assembly line manufacturing of household appliances or automobiles, drilling a hole is one of the most basic and common processes. This is also true in the manufacture of aircraft. However, considering the relative size and complexity of an aircraft's construction relative to that of a home appliance or an automobile, it can be appreciated that there's a substantial amount of time and labor invested in drilling holes in manufacturing aircraft.

Most holes drilled in manufacturing aircraft are drilled by labor-intensive multi-step manual methods. One or more workers at workstations along the assembly line manually orient the drill at the designed position at the surface of the object to be drilled and manually perform the drilling operation into the surface. In addition many, if not most, of the holes drilled in the manufacture of an aircraft are drilled into singular or compound curvature surfaces. It is required that the holes drilled into these surfaces be accurately positioned and shaped. This requires the use of drill alignment devices by the worker, such as drill cups or drill jigs, to properly orient and position the drill relative to the contoured surface when performing the drilling operation. Without the use of these drill alignment devices, oversized, misshapen, and non-normal holes may result, requiring expensive rework of the object being manufactured.

Automated drilling machines have improved the drilling operations in manufacturing processes. However, such machines are typically very expensive and require a considerable investment in software programming for the various different component parts or objects that are drilled in manufacturing the aircraft.

What is needed to overcome these disadvantages of prior art drilling processes is a drilling apparatus that can be easily positioned by the worker and activated by the worker to produce a properly located normal hole in a contoured surface of an object being manufactured.

SUMMARY

In one embodiment, a self-normalizing contour drilling machine of the disclosure is basically comprised of a drill spindle, sensors to collect and process information about the object surface, controls to command the actuators, an operator interface, and actuators to position the drill spindle. Generally there is a work table that is configured to support the object that is to receive a drilled hole. The drill is positioned over the object and automatically oriented perpendicular or (normal) relative to the object surface in preparation to drill a hole into the object surface. A movable drill support adjacent the work table supports the drill head assembly and provides longitudinal and lateral movement over the work table. A pair of orthogonal linear actuators attached at one end to the drill support operatively connects the drill to the drill support for movement of the drill about two mutually perpendicular spindle axes. Movement of the drill in a conical rotation about the two spindle axes properly orients the bit of the drill in a normal orientation relative to the contoured surface of the object to be drilled. After the drill is properly oriented, a subsequent drill command will cause a drill actuator supported on the spindle assembly to move the drill bit a predetermined distance toward the contoured surface of the object, and thereby drill a hole into the object at a predetermined depth and feedrate, while maintaining a normal orientation relative to the contoured surface of the object.

A pair of orthogonal structured line generating lasers project laser lines on the part surface. From the rotation and offset of the laser lines relative to the image frame of the vision system camera the inclination and elevation errors of the drill spindle relative to the part surface can be resolved. With an illuminated second image of the surface, the presence and relative location of a target pilot hole or ink spot can be resolved. In the current embodiment the image processing and analysis is performed in the vision camera and the results transmitted to a motion controller which monitors the user interface and controls the movements of the various axes to correct the drill spindle position relative to the surface and drill target.

Computerized controls of the contoured drilling machine continuously position or servo the drill spindle with the drill bit normal to the compound curved or contoured surface of the object while maintaining a precise distance from the surface. In addition, the computerized controls of the contour drilling machine autonomously identify previously drilled pilot holes or paint spots on the object surface and on command, position the drill spindle and the drill bit over the holes or spots. The longitudinal and lateral axes are free to move, until the action to center the drill bit over a hole is activated. When the action to center the drill bit over a hole is activated, electromagnets lock the longitudinal and lateral axis. The computerized controls then issue commands to extend or retract linear actuators which move the longitudinal and lateral axis relative to the electromagnets to center the drill over the hole.

The machine does not require any prior information about the object surface or the location of holes to be drilled. The machine does not have to be prior referenced to the object surface or have the requirement for accuracy over any significant distance. The machine continually corrects, compares, and converges its orientation and position to the surface and hole location. This makes the contour drilling machine of the disclosure especially useful for mobile drilling systems, moving assembly lines, and the manufacture of objects that do not have computer modeled surfaces. The machine can therefore be manufactured inexpensively and installed at a workstation of an assembly line without precision alignment.

BRIEF DESCRIPTION OF THE DRAWINGS

Further features of the disclosure are set forth in the following detailed description of the embodiment of the disclosure and in the following drawing figures wherein.

DETAILED DESCRIPTION

Figure 1:
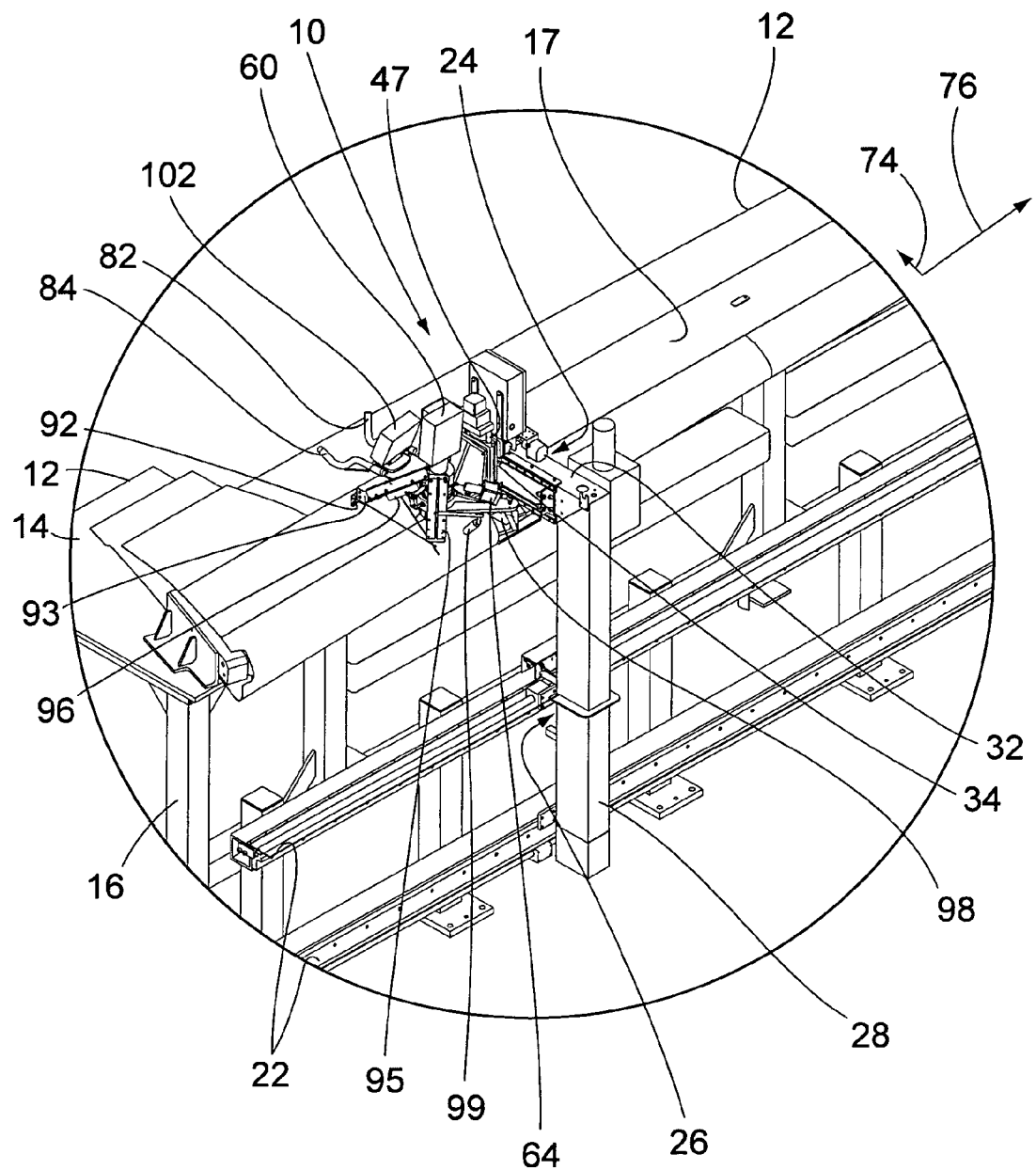
FIG. 1 is perspective view of the self-normalizing contour drilling machine apparatus of the present disclosure.
Figure 2:
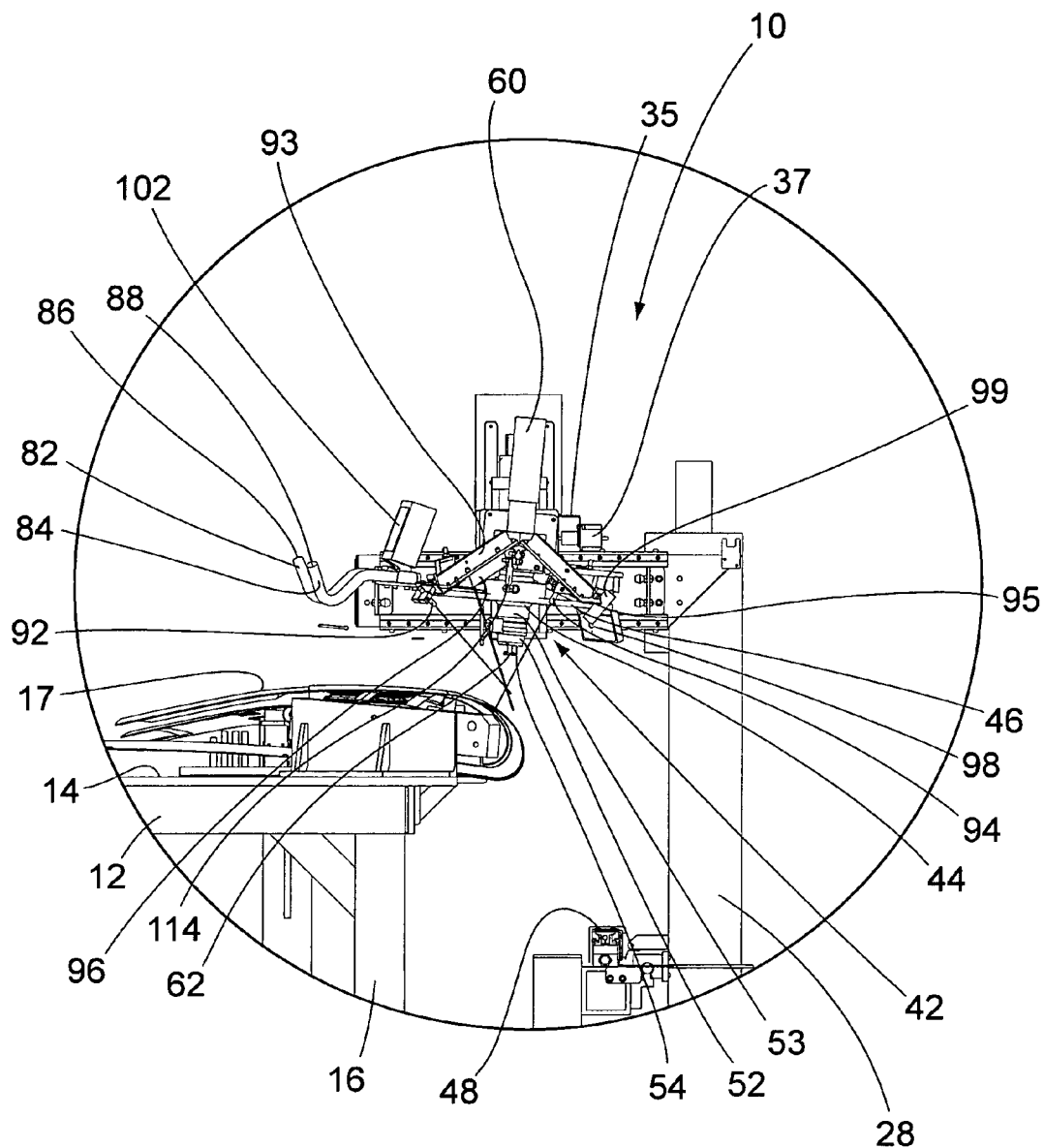
FIG. 2 is an enlarged portion of FIG. 1 showing some details of the apparatus as seen from the right side of the apparatus.

FIG. 1 shows the self-normalizing contour drilling machine apparatus 10 of the present disclosure positioned adjacent a workstation or work table 12 of an assembly line. Although the apparatus of the disclosure 10 is shown positioned adjacent an assembly line work table 12, it is not limited to use in this environment. It is intended that the apparatus 10 be adaptable for use in various different embodiments and environments where it is desired to easily drill a number of holes into a contour surface of an object being manufactured with each of the holes being positioned normally to the surface.

The workstation table 12 shown is representative of basically any type of workstation table used in the manufacture of component parts or objects. The table 12 has a table surface 14 that supports the object of manufacture. A support structure 16 supports and positions the table surface 14 at a desired location relative to the worker(s) working at the workstation. As shown in FIG. 1, the table surface 14 has a longitudinal length and lateral width.

The apparatus 10 of the disclosure is mounted on a conveying structure having a pair of conveying rails 22. The rails 22 are positioned adjacent to the workstation table 12 and extend longitudinally along the length of the table.

A drill support mechanism 24 is mounted on the conveying rails 22 for controlled movement of the mechanism along the rails. The drill support mechanism 24 includes a motive device 26 that is mounted on the rails 22. The motive device 26 is selectively operable to travel in longitudinally opposite directions along the length of the rails 22.

A drill support vertical member 28 extends upwardly from the motive device 26. The vertical member 28 extends upwardly adjacent the workstation table 12 to a position above the table surface 14.

A drill support horizontal member 32 is mounted at the top of the drill support vertical member 28. The horizontal member 32 extends outwardly from the vertical member 28 to a position over the table surface 14. The self-normalizing contour drilling machine apparatus 10 is supported by a twin-axis rail and lateral motive device 34 between the apparatus 10 and the horizontal member 32. The lateral motive device 34 enables the selective horizontal reciprocating movement of the apparatus 10 laterally over the table surface 14.

A motorized axis 45 vertically oriented relative to the table surface, is mounted to lateral motive device 34. The drill head base plate 46 is connected to the carriage 47 of the vertical axis 45 by the connecting bracket 43 for vertical reciprocating movement of the drill head base plate 46 relative to the drill support horizontal member 32.

The apparatus of the disclosure 10 includes a protective framework 38 that extends around and protects the optical component parts of the apparatus. The protective framework 38 is connected to the drill spindle assembly 42 and moves as a unit with the spindle 42 and optic support arms 93 and 95 providing protection from alignment disturbing impacts to the vision system camera 96 and laser line projectors 92 and 94. The protective framework 38 is not connected directly to any optical component.

A spindle assembly 42 is supported by the drill head base plate 46. The spindle assembly consists of drill housing 53, drill mechanism 52, drill chuck 54, nosepiece 62 and drill actuator 60. The spindle assembly 42 is mounted to the drill head base plate 46 through a spherical bearing consisting of a ball 44 mounted in a socket assembly for pivoting movement of the spindle assembly 42. The spindle assembly 42 is mounted to the spherical bearing in a through hole in the ball 44. A restraint device 114 connected between drill head base plate 46 and the spindle assembly 42 allows freedom over a range of conical spindle movement relative to the drill head base plate 46, but restrains rotation of the spindle assembly 42 about the spindle centerline.

A drill mechanism 52 is mounted in the bore of drill housing 53. The drill mechanism is restrained from lateral and rotational movement relative to the drill housing 53. The extension and retraction of the drill mechanism relative to the drill housing is selectively driven by the linear drill actuator 60. The drill mechanism 52 includes a drill bit chuck 54 that projects downwardly from the mechanism. The drill bit chuck 54 is shown with an attached drill bit 56. A nose piece 62 extends downwardly around the drill bit chuck 54 and the drill bit 56. The nose piece 62 is spring biased and it exerts a downward pressure on the surface into which a hole is drilled by the drill bit 56. The nose piece 62 thereby exerts a compaction force on the layers of materials being drilled by the drill bit 56, forcing the layers together to minimize interlaminar drill burrs. The drill actuator 60 includes a motor and control system 58 that drives the drill bit chuck 54 and drill bit 56 at a variety of different feedrates and depths. Thus, activation of the drill actuator 60 moves the drill bit 56 toward and away from the workpiece surface 17.

Figure 3:
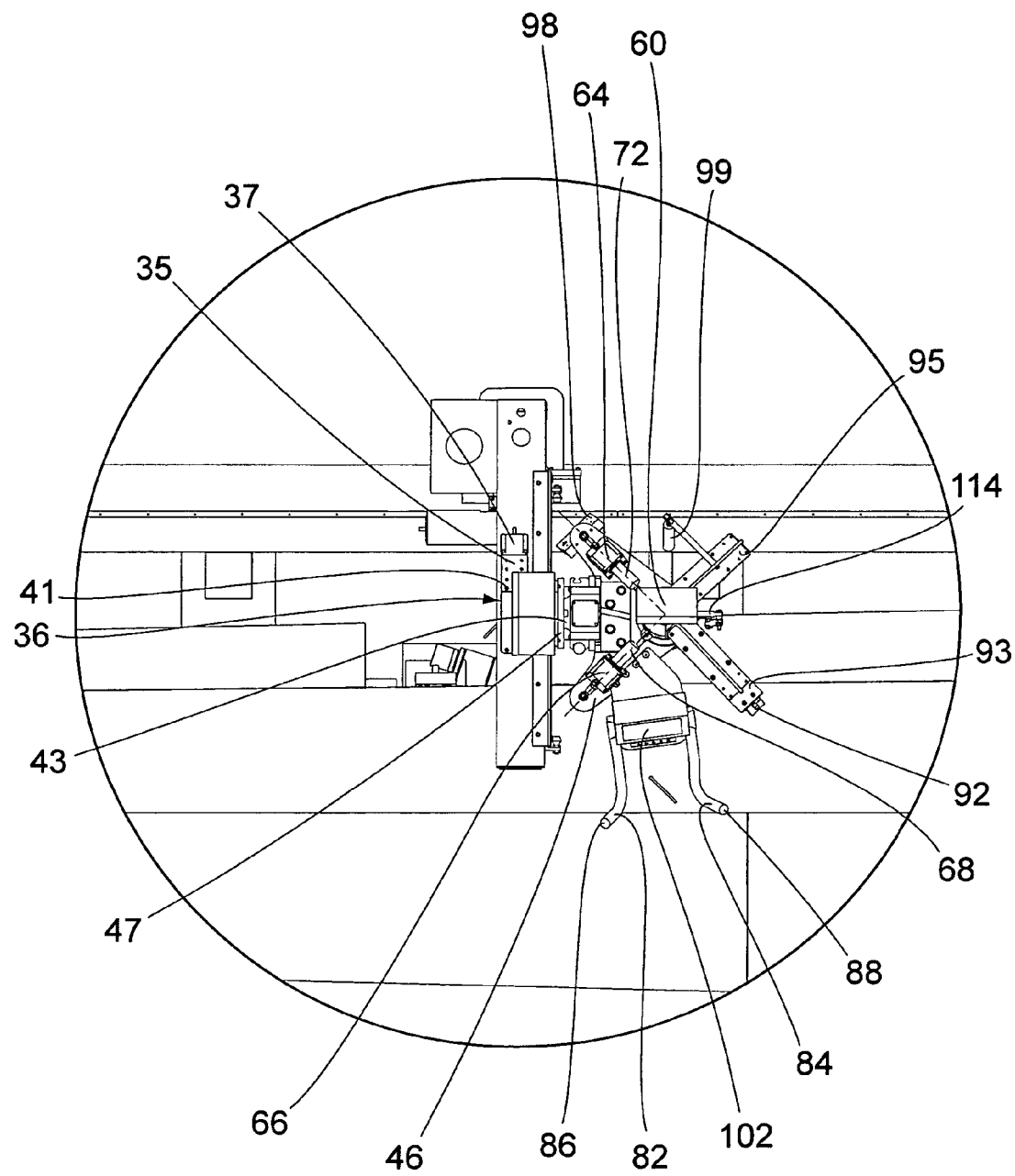
FIG. 3 is a top view of the apparatus.
Figure 4:
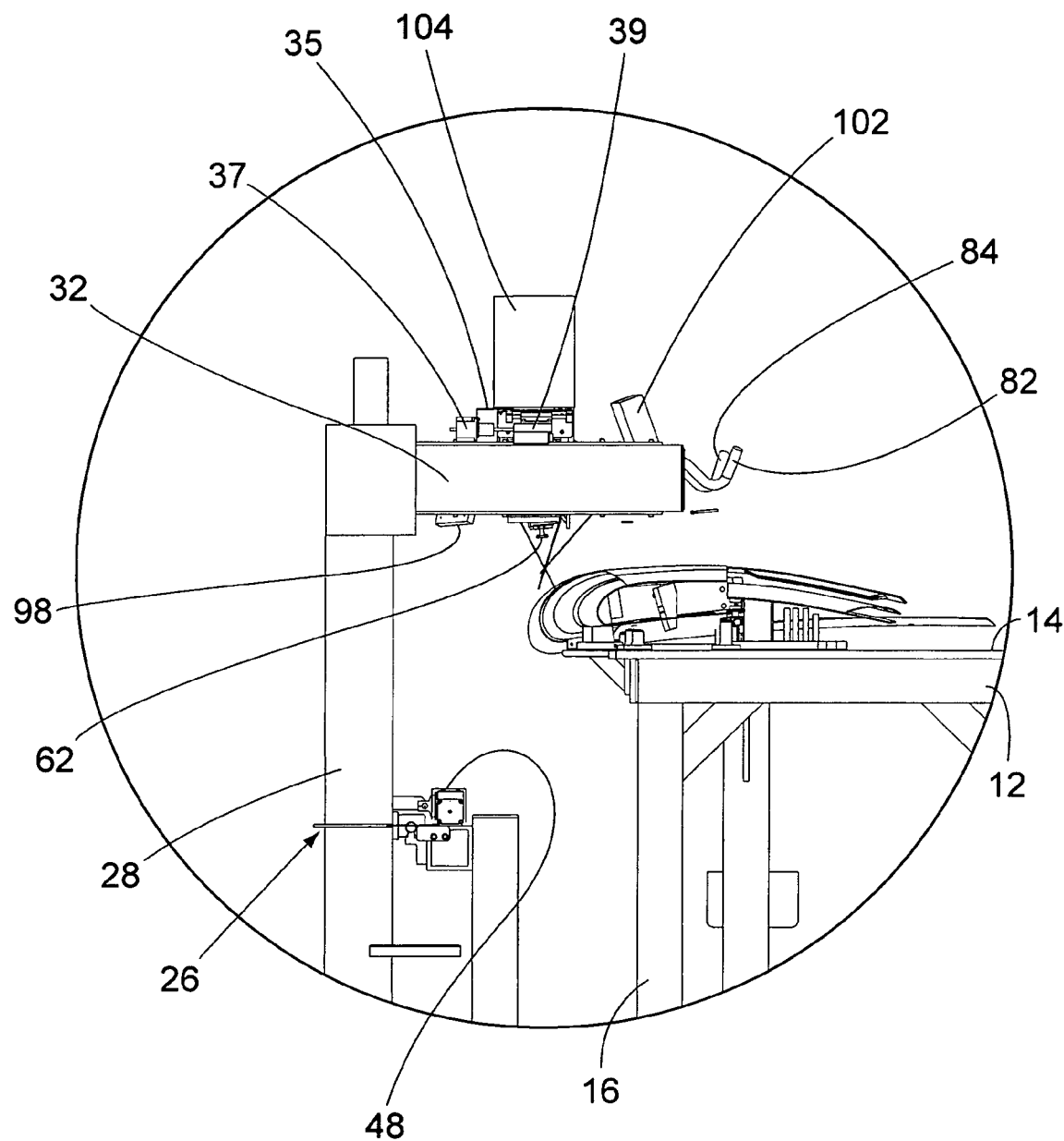
FIG. 4 is another enlarged portion of FIG. 1 showing some details of the apparatus as seen from the left side of the apparatus.
Figure 5:
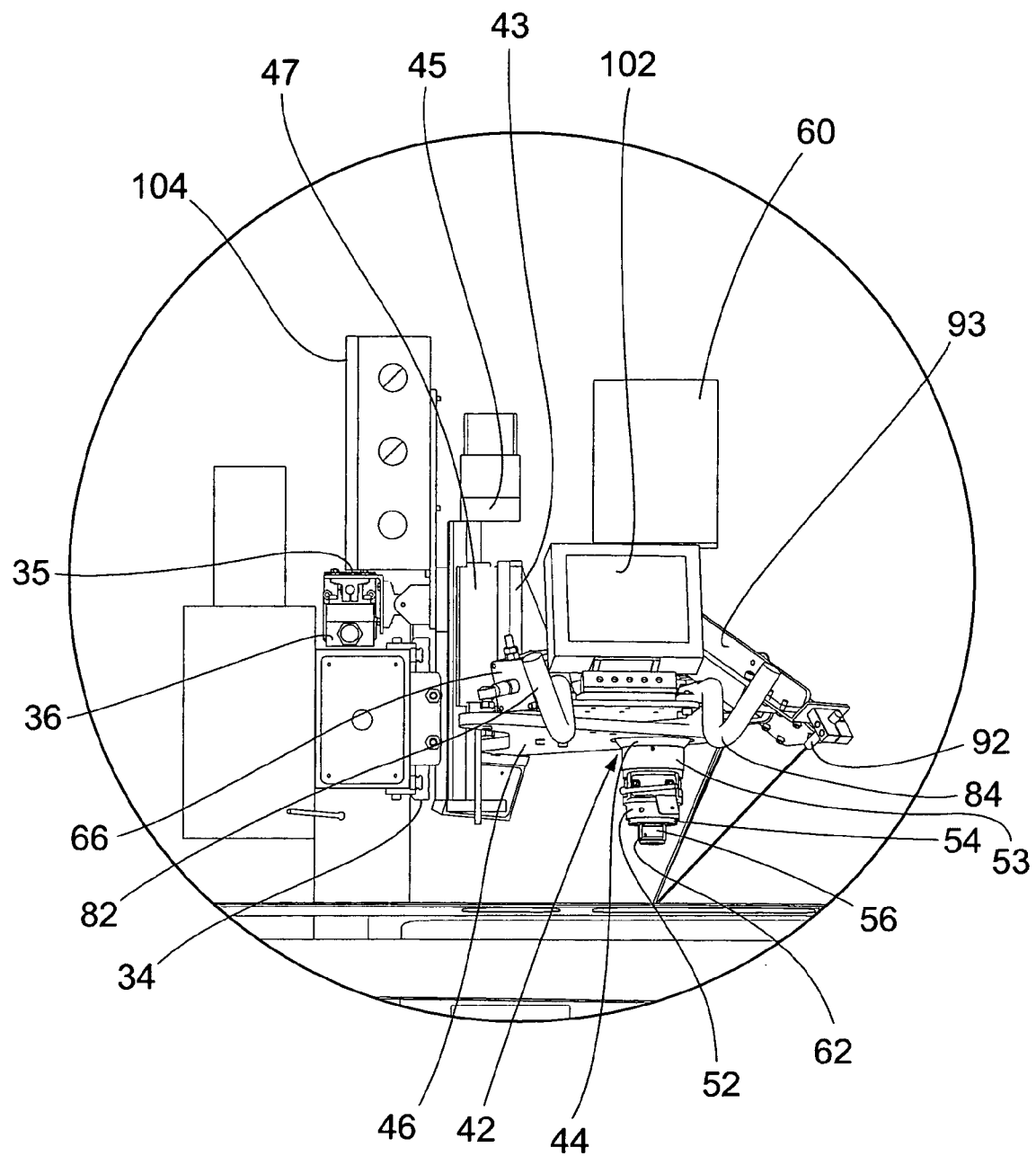
FIG. 5 is a front view of the apparatus.

A pair of linear actuators 64, 66 are connected between the drill housing 53 and the drill head base plate 46. The spindle actuators 64, 66 have a spherical bearing attachment at both the housing and rod end. The spherical bearing ends allow the linear actuators freedom to swivel relative to both the drill housing 53 and drill head base plate 46. As the linear actuators 64, 66 reciprocate they pivot the spindle assembly 42, attached components, and the spherical ball 44 relative to the drill head base plate 46. The linear spindle actuators 64, 66 could be electric actuators, hydraulical actuators, or other equivalent types of actuators. Pivoting of the spindle assembly 42 could also be accomplished by using two rotary actuators mounted in series with mutually perpendicular axes. As best seen in FIG. 3, the linear spindle actuators 64, 66 are oriented at a 90 degree angle relative to each other and pivot the drill housing a the spindle ball 44 about respective, perpendicular axes 68, 72 on reciprocation of the actuators. In addition, the spindle ball pivot axes 68, 72 are each oriented at a 45 degree angles relative to a lateral axis of movement 74 and a longitudinal axis of movement 76 of the apparatus 10 over the work table surface 14 by the drill support mechanism 24. The reciprocating movement of the rods of the spindle actuators 64, 66 pivots the spindle ball 44 and the bit 56 of the spindle assembly 42 about the two, mutually perpendicular spindle axes 68, 72. The change in angular position of the spindle assembly 42 relative to the drill head base plate 46 is approximately proportional to the vector sum of the changes in length of the two linear actuators 64 & 66.

A pair of manual control arms 82, 84 project outwardly from the forward side of the apparatus 10 over the workstation table surface 14. Each of the manual control arms 82, 84 has a distal end with a "seek" actuator 86 at one arm end and a "drill" actuator 88 at the opposite arm end. The "seek" actuator button 86 and "drill" actuator button 88 are selectively operable by the worker stationed at the workstation table 12.

A pair of laser line projectors 92, 94 are mounted on support arms 93 and 95. The support arms 93, 95 are rigidly mounted to the drill housing 53. Thus the laser line projectors 92, 94 pivot and translate as a unit with the spindle assembly 42. The laser line projectors 92, 94 each project a single focused straight line with a suitable fan angle such that the length projected on the workpiece surface 17 exceeds the machine vision camera 96 field of view. The laser line projectors 92, 94 are positioned on the support arms 93, 95 to project laser lines on the workpiece surface 17 being manufactured on the table. The laser line of each projector 92, 94 is rotated in position to project a line onto the workpiece surface 17 perpendicular to the pointing vector of each laser. The laser projectors 92, 94 are also adjusted in pitch angle such that the intersection of the two lines on the workpiece surface 17 is located at the point the spindle centerline axis intersects the workpiece surface 17 with the nosepiece 62 a preselected distance above the workpiece surface 17. In one, embodiment the preselected distance is about 2 inches from the workpiece surface. The distance may be selected to provide the machine vision camera 96 a clear field of view to the laser lines and work surface 17 without intrusion of the nosepiece into the image.

The laser lines projected by the projectors 92, 94 onto the object surface intersect as perpendicular lines that are visible to the worker stationed at the workstation table 12. The intersecting laser lines produce a visible crosshair that marks the approximate point at which a hole will be drilled by the drill bit 56, providing an aid to the worker positioning the apparatus 10 near the target location of the hole to be drilled.

The machine vision camera 96 is also mounted on the support arm 93 with laser projector 92. The machine vision camera 96 is positioned on the support arm 93 so that it is directed toward the intersecting lines of the laser line projectors 92, 94. Thus, the machine vision camera 96 acquires a visual image of the intersecting lines projected by the laser line projectors 92, 94 on the workpiece surface 17.

An infrared strobe light 98 is mounted under the drill head base plate 46. The strobe light 98 is positioned under the drill head base plate 46 on the opposite side of the spindle assembly 42 from the camera 96 mounted on the support arm 93. The strobe light is oriented to project a triggered infrared light pulse to the area viewed by the camera 96. The strobe light 98 is mounted at a different incidence angle to the workpiece surface 17 than the camera 96 to minimize specular reflection into the camera 96. The relative orientation of the strobe light 98 and the machine vision camera 96 results in the far side of a target pilot hole from the camera 96 to be shadowed from the infrared strobe 98, providing good contrast of the far edge of the hole. The camera view of the near side of the hole appears as an bright edge contrasted against the dark far wall of the hole. Thus the relative positioning of the strobe light 98 and camera 96 to the workpiece surface 17 provides excellent definition of the pilot hole edge location. If the hole target designators are paint spots or similar marks, the strobe light 98 location is not as critical. If the range of travel of the pivoting spindle assembly 42 exceeds much more than about±20 degrees, the strobe light 98 can be attached to a bracket mounted to the drill housing 53, so that it moves as a unit with the spindle assembly 42 and the optical components (the laser projectors 92, 94 and the camera 96.).

The longitudinal motive device 26 and lateral motive device 34 are free to move, until the action to center the drill bit 56 over a target hole located is begun. When the action to center the drill bit over a hole is started, the lateral axis electromagnet 39 anchors one end of the linear actuator 37. The controls 58 then issue commands to extend or retract the linear actuator 37 that is connected at one end to electromagnet 39. The opposite end of the linear actuator 37 is connected to lateral motive device 34. Thus as the linear actuator 37 reciprocates it moves the lateral motive device 34 relative to the electromagnet 39 to center the spindle assembly 42 over the hole target. A longitudinal positioning device 48 similar to the lateral positioning assembly 36 (i.e. the linear actuator 37, electromagnet 39, and a connector plate 35 for connecting the actuator 37 to the spindle housing 42) described above is used to move the longitudinal axis into position over the hole target. The longitudinal position assembly 48 reciprocates the longitudinal motive device 26 relative to the upper surface of longitudinal rail 22. The electromagnet anchored actuators of the assemblies 36 and 48 are simple mechanisms that provide a means of allowing low force manual positioning of the lateral and longitudinal motive devices 34 and 26. This method is preferred for setting the drilling position along the lateral and longitudinal axis when these axis are generally horizontal. However when either axis is vertical, disengagement of the motive device for ease of positioning is not convenient because the motive device will move downwardly under the influence of gravity. Thus, for setting the drilling position along vertical axes, belt or gear drives may be used to allow the operator to jog the corresponding motive device to a location near the hole target position The apparatus 10 then performs the final targeting in an automatic fashion.

A camera display or monitor 102 is mounted on an extension of the drill head base plate 46 in a position between the manual control arms 82, 84. The scene camera 99 communicates with the monitor 102 and the monitor displays the view of the camera. The scene camera 99 provides the operator with a close-up view of the workpiece surface 17 around the area under the spindle assembly 42. The information from the scene camera 99 is used as an operator aid while the image processor 112 communicates with the machine vision camera 96. The monitor 102 is oriented and positioned across from the line of sight of a worker stationed at the workstation table 12 to be easily viewed by the worker.

The self-normalizing contour drilling apparatus 10 of the present disclosure is designed to clamp-up, drill and countersink fastener holes in an object being manufactured on the workstation table 12. The apparatus 10 is capable of automatically orienting the drill spindle assembly 42 and the drill bit 56 perpendicular to any surface of the object under the drill point, while maintaining a precise distance from the surface. In addition, the apparatus 10 recognizes pilot holes or target marks on the object surface to be drilled and on command automatically centers the drill point over these position indicators.

The control system of the apparatus 10 performs its function without computerized numerical controls (CNC) programming of tool paths or the need to identify the position or orientation of the object being drilled. To help accomplish this, the apparatus 10 uses the pair of laser line projectors 92, 94 that project a crosshair pattern on the object surface. The worker manually positions the drill spindle assembly 42, with the laser crosshair as a guide, near a pilot hole or target mark indicating the desired hole position on the surface. When the operator presses the "seek" actuator button 86 on the manual control arm 82, the machine control system of FIG. 6 takes over and centers the drill spindle assembly 42 and the drill bit 56 over the indicated drill location and pivots the spindle assembly normal to the surface.

The machine vision system 110 consists of the machine vision camera 96 and programmable image processor 112. The image processor 112 acquires from the camera 96 an image of the laser lines projected on the workpiece surface 17 and uses developed software to measure the angle and elevation of the drill spindle assembly 42 relative to the surface 17. The information is transmitted to the control system 58 that pivots the spindle assembly 42 about the spindle actuator axes 68, 72 and moves the spindle assembly 42 along the axis of the vertical axis actuator 45 to correct its angle and elevation relative to the object surface. The motion control system 58 continuously collects information from the image processor 112 about the workpiece surface 17 inclination and elevation, and continuously adjusts the angular position of the spindle assembly 42 and its elevation relative to the workpiece surface 17.

Figure 6:
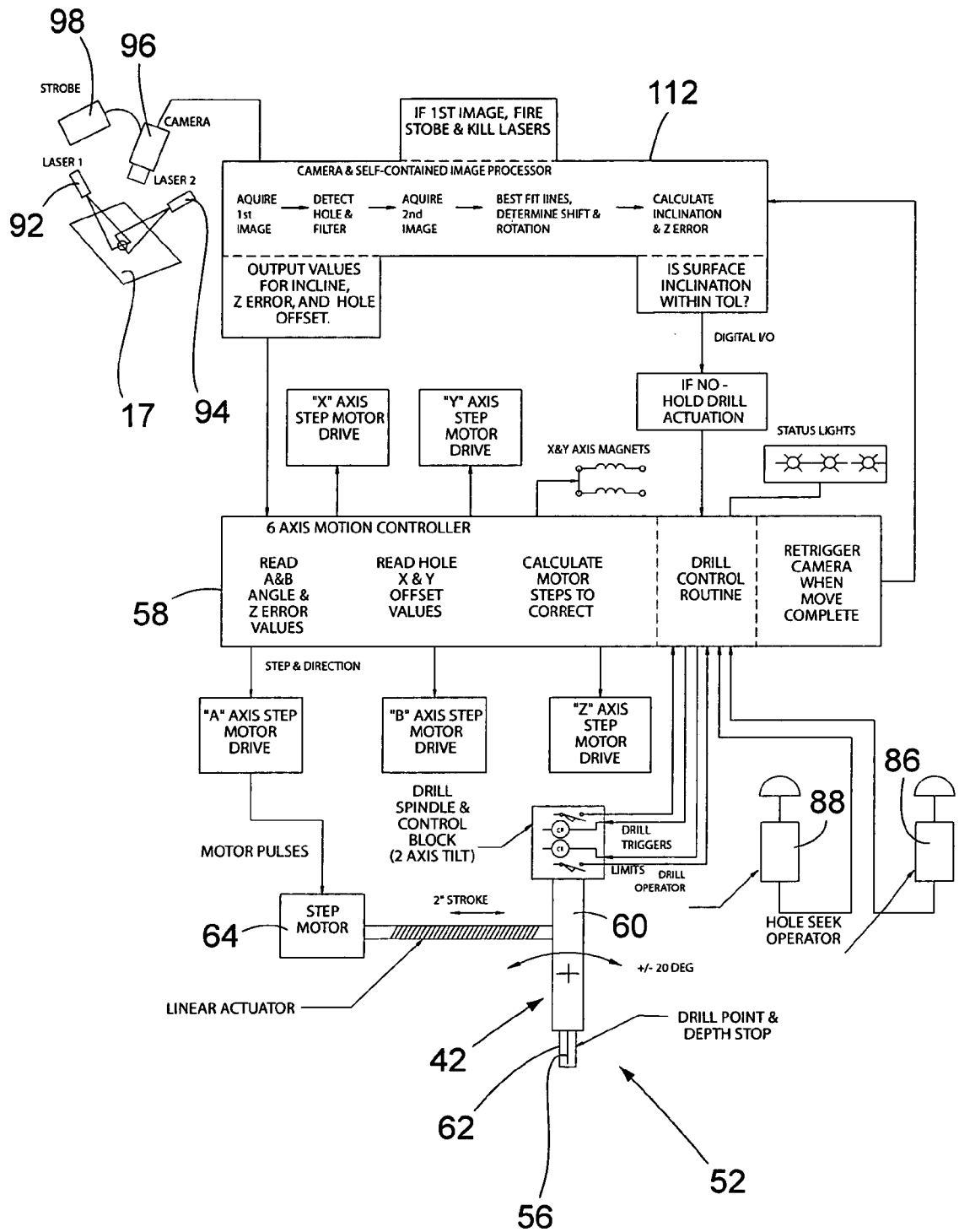
FIG. 6 is a schematic representation of the control system of the apparatus.
Figure 7:
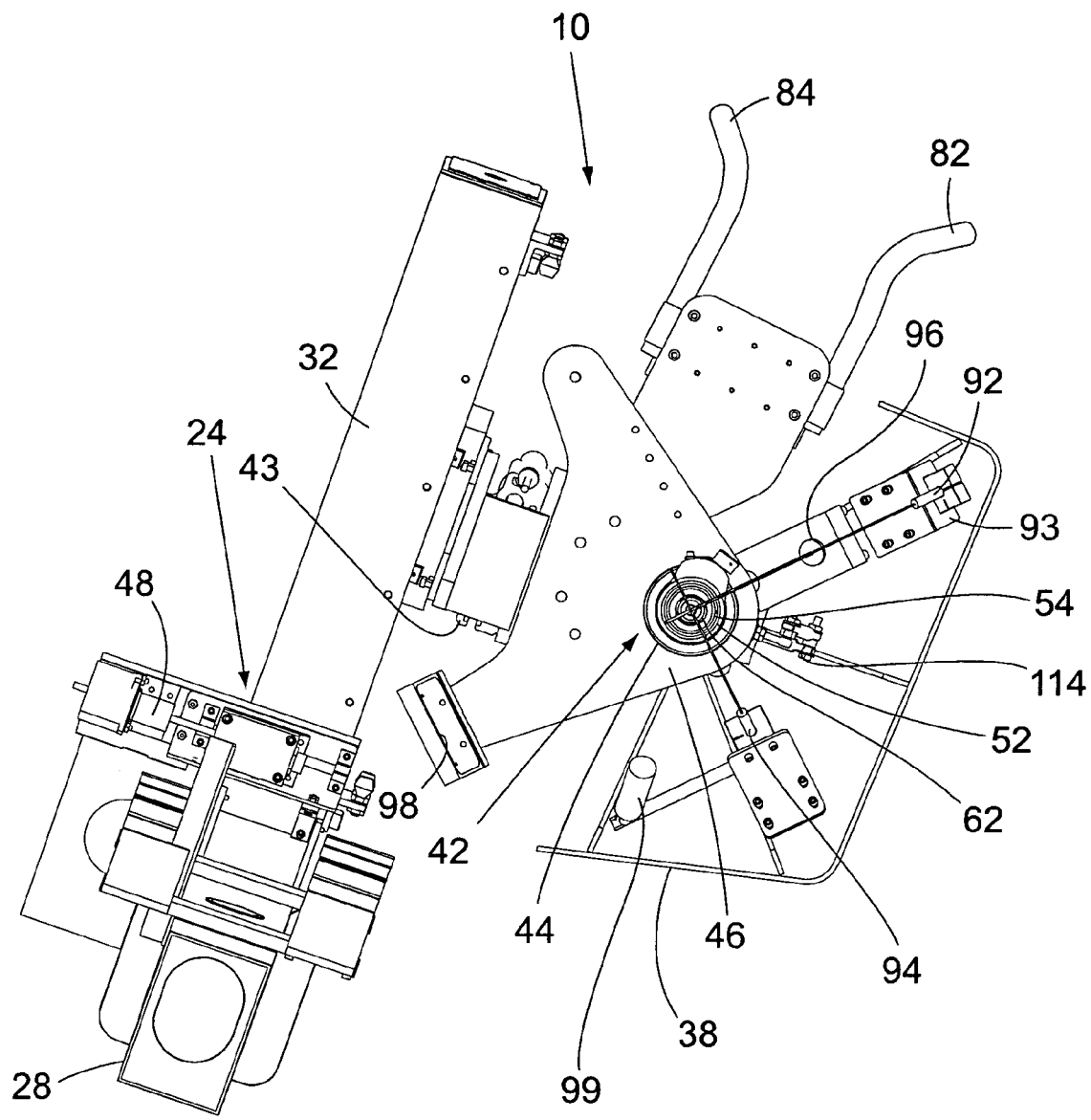
FIG. 7 is a view similar to that of FIG. 3 from the bottom side of the apparatus.
Figure 8:
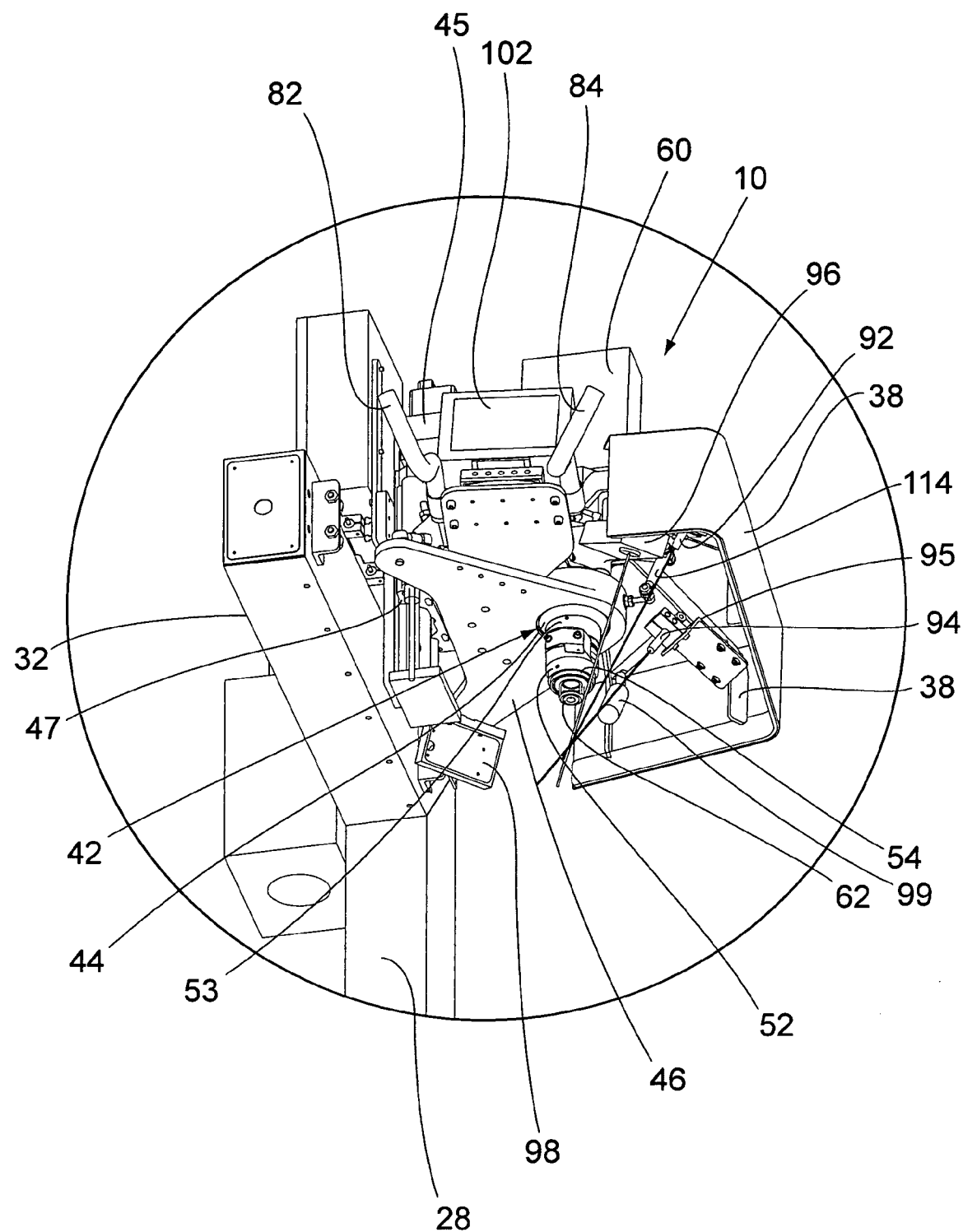
FIG. 8 is an perspective view of the apparatus as seen from below and in front of the apparatus.

The image processor 112 is programmed to recognize the pilot holes or target markings, countersunk holes, and surface edges of the object being manufactured. This information is communicated with the motion controller 58 of the apparatus 10, which (on operator command) centers the drill spindle assembly 42 over the targets by operation of the longitudinal and lateral actuators 36, 48. For simplicity, only one of the 5 axes under command of the motion controller 58 is shown in FIG. 6.

This ability to measure and correct the normality of the spindle assembly 42 under the spindle center line in real time without surface contact and to position the drill spindle 42 over a drill target eliminates the need for CNC programming. A convergent servo method used by the apparatus 10 can establish very accurate final spindle 42 positioning despite mechanical and alignment inaccuracies of the apparatus 10, mathematical and geometric simplifications and linearizations, and optical distortions. The drill function is not enabled until the drill spindle 42 alignment meets predetermined normality and positioning tolerances. If the positioning is not satisfactory, the servo cycle is repeated until the position converges within tolerance.

There are two images acquired and processed by the vision system 110 of the workpiece surface 17 for each servo cycle of apparatus 10. The two images are acquired in rapid succession. The first image is stored in memory without pausing to process the image and the second image is immediately acquired to minimize any position shifts between the two images. Both of the images are then processed.

The brightness of the first and second images are analyzed and independent automatic exposure control algorithms are executed to allow the apparatus 10 to be used with various workpiece surface 17 emissivities ranging from bare metal to darkly painted surfaces.

The first image is acquired by the camera 96 with the infrared (IR) strobe pulse of the strobe light 98 firing. The strobe light 98 illuminates the surface at a direction, angle, and intensity to cause good contrast in the images of the pilot holes, target features, and edges. The infrared strobe light 98 is used because it is invisible to the human eye, where a bright visible flash many times a second would be disturbing to the worker. The infrared strobe light 98 is beyond the range of human visual sensitivity, but within the response range of most electronic image sensors (e.g. camera 96). The laser line projectors 92, 94 are turned off for the duration of the strobe pulse and the acquisition of the first image to prevent the laser lines from complicating the image or being mistaken for a surface crack or edge.

This first image is processed to identify targets such as pilot holes or marks designating the desired hole locations. Potential targets are analyzed to determine whether they meet criteria such as contrast, diameter, and shape to prevent false identification of targets. After a valid target has been identified, its offset relative to the spindle centerline is determined, the vector components in the longitudinal and lateral directions of the offset are calculated, and predetermined calibration offsets are applied, if desired, to account for known bias in the system. The corrected longitudinal and lateral errors are stored for later transmission to the motion controller.

The first image is also processed to identify countersunk holes, gaps and edges of the skins of the object being manufactured. If an edge of an object in the field is determined to intersect with one of the two laser lines used to determine spindle 42 normality, the process is aborted without processing the second image. In this situation, the presence of the edge is communicated to the motion controller 58. The motion controller 58 does not perform any spindle 42 position correction, but turns on an indicator alerting the operator of the detected edge in the image, disables the drill function, and retriggers the camera 96 to acquire new images.

The second image is acquired by the vision system via the laser projectors 92, 94 on and the strobe 98 off. The laser lines projected on the workpiece surface 17 by the line projectors 92, 94 show up in contrast to the workpiece surface 17. Information from the first image is used to filter the second image of portions of the projected laser lines that fall in or near pilot or countersunk holes before the laser lines (in the second image) are processed to determine the surface 17 inclination and elevation.

The line from laser projector 94 oriented orthogonally to the direction in which the machine vision camera 96 points, appears as approximately vertical in the image. The rotation from vertical of this line in the image is calculated to provide pitch error relative to the camera view incidence angle. The location of both edges of the finite width line is sampled at many locations down the length of the line. Data from areas that contain holes and the intersecting laser line plus outlying data points are discarded and the remaining data is processed to determine the best fit rotation of the line at the line centerpoint (i.e. the target location). The angular error is calculated and predetermined calibration offsets are applied, if desired, to account for known bias in the system. The angular error is eliminated by the motion controller 58 adjusting the length of the linear actuator 64 that is orthogonal to the direction that projecting laser 94 points.

The line from laser projector 92 located in plane with the direction that machine vision camera 96 points, appears as approximately horizontal in the image. The rotation from horizontal of this line in the image is calculated to provide roll error relative to the camera view incidence angle. The line is filtered of holes, countersinks, and the like then analyzed to determine rotation in a manner similar to the vertical line. The calculated angular error is eliminated by the motion controller 58 adjusting the length of the linear actuator 66 that is orthogonal to the projecting laser 92. In addition, the vertical offset of the horizontal line in the image is used to calculate the elevation error. When the information from both images has been processed, the vision system 112 transmits the data to the motion controller 58. Information transmitted to the motion controller includes the detection of any hole target or edge, the normality errors determined via the lasers 92 and 94, the elevation error, and the lateral and longitudinal offsets of any hole target found.

The motion controller 58 calculates and executes the required motion commands to correct the normality errors and elevation error, unless an edge has corrupted the image. If a hole target is present and the operator has depressed the "seek" actuator switch 86, the motion controller 58 also corrects the lateral and longitudinal offsets from the target. After all motion is complete the motion controller 58 triggers the vision system 112 to restart the image acquisition process and a new servo cycle is started to detect and eliminate any remaining position or orientation error.

When the drill spindle assembly 42 and drill bit 56 are oriented perpendicular to the workpiece surface 17, with the correct elevation, and are centered over a drill target on the surface, the motion controller 58 enables the drill actuator switch 88 and waits for the command from the worker to drill the hole.

By the worker then pressing the "drill" actuator switch 88 on the manual control arm 84, the drill cycle is initiated and the drill motor 58 is activated and the drill actuator 60 moves the drill bit 56 toward the object surface. The drill cycle can be aborted at any time by releasing either the "seek" or "drill" buttons. This "two-handed" operation is an added safety feature.

If the drill cycle was successful and the worker continues to hold the "seek" button 86, the machine will automatically move in a predetermined direction in increments equal to the field of view of the camera 96 to search out the next hole to be drilled. When the next hole is identified by the control system, the drilling process is repeated. Optionally, the control system 110 can be configured such that the "drill" switch has to be released for a moment and pressed again before the next hole is drilled.

In a embodiment, a relatively simple user interface is provided. The user interface includes five status lights which are set by the motion controller. The first status light is a heartbeat indicator that flashes each time the machine completes a servo cycle. The second status light indicates whether the spindle is normal to the surface within the allowed tolerance. Another status light indicates whether an interfering edge has been detected. Yet another status light indicates whether a hole target has been detected. The fifth status light indicates that the spindle has been centered over the hole target within the allowed tolerance.

The user interface also includes 6 command, or override, switches. The first of these switches is a 2 position vertical jog switch that moves the vertical actuator 45 up and down. This switch is used to bring the spindle and optics near the preselected elevation above the workpiece surface 17 so that both laser lines appear in the camera image. The second switch of the current embodiment is a stop switch that inhibits the servo cycle and any resulting automatic motion of the apparatus 10. A target override switch allows a hole to be drilled manually without a hole target having been identified by the image processor 110. The normality correction can remain active even with target detection being overridden. In particular, this feature of the current embodiment is useful for machine drill depth setup (i.e. zeroing the vertical travel of the drill). Another switch of the user interface initiates a system homing procedure that determines the reference position of all actuators (i.e. zeroing the horizontal travel of the apparatus 10). The remaining two switches of the current embodiment are the "Seek" and "Drill" switches previously discussed. The first three switches optionally are located on the operator control station 104.

Optionally, the apparatus 10 can communicate with a remote enhanced operator graphical interface screen with provisions for adjusting drill parameters such as feedrates, drill depths, rpm and chip clearing "peck" cycles. Parameters for multiple drill cycles could be programmed with the particular drill cycle to be used for drilling a given hole selected by a multi-position switch, thumbwheel, or other equivalent input device (e.g. a multifunction touch screen) at the operator control station 104.

In another embodiment, the apparatus includes translating spindle assembly and rigid nosepiece to provide part clamp-up with a secondary drill mechanism actuation, instead of the spring loaded collapsible nosepiece 62 that is rigidly attached to the drill mechanism 52 previously described. In yet another embodiment, the lateral and longitudinal rails and motive devices are replaced with an overhead "gantry" like assembly for lateral and longitudinal positioning of the spindle 42. Jog positioning devices can also be provided for positioning the drill along any of the axes of the apparatus 10. Remote pendant controls that includes an integral monitor 102, the lateral and longitudinal jog controls, plus additional operator controls such as the "seek" and "drill" buttons can be provided for the various embodiments of the present disclosure. Additionally, a color camera 96 can be used to automatically select drill parameters based on the hole target color. Similarly different shapes can be used for hole target to indicate to the image processor 112 which drill parameters to select for the various holes to be drilled. In the alternative to the apparatus 10 a six or seven axis robot can be used to position the spindle assembly and attached optical devices. Thus, generation of local reference information and use of the convergent servo technique in accordance with the principals of the present disclosure eliminate the inaccuracies of typical robots associated with previous methods of positioning and orientating drills relative to contoured surfaces. No robot path programming would be required.

Although the apparatus of the disclosure has been described above with reference to a specific embodiments, it should be understood that variations and modifications could be made to the apparatus without departing from the intended scope of the following claims.

The invention claimed is:

1. A method of locating a position to drill a hole in an object surface and drilling a normal hole in the surface, the method comprising:

positioning a drill and drill bit, supported for rotational movement from a spindle, adjacent a hole mark on the object's surface, the spindle having a spindle axis centerline;

automatically orienting the drill bit at a normal orientation to the surface at the hole mark, the automatically orienting operation comprising:

projecting optical signals from a pair of orthogonal signal devices to form laser lines in a cross hair pattern on the surface at the hole mark, and underneath the spindle and longitudinally in line with the spindle axis centerline;

using a camera having an axis of sight to obtain an image frame of the laser lines and a portion of the surface;

a first one of the laser lines being projected orthogonal to the axis of sight of the camera and indicating a pitch error relative to an incidence angle of the axis of sight with the surface;

a second one of the laser lines being projected in-plane to the axis of sight of the camera and indicating a roll error relative to the incidence angle of the axis of sight with the surface;

the laser lines being used to assist in determining normality of said drill bit relative to said surface at said hole mark and an elevation of said drill bit above said surface;

obtaining an image frame, using the camera, of the surface at the hole mark, the image frame including the laser lines;

using the image frame of the laser lines to generate angular position information that includes the pitch error and the roll error for use by a processing system;

using a processing system to process the angular position information to determine an inclination angle of the surface relative to the spindle axis, and without need for a predetermined computer generated model of the object;

using the inclination angle to assist in positioning a drill implement directly over said position where said hole is to be drilled so that a normality error of said surface relative to said spindle is removed and said drill implement is positioned normal to said surface of said object; and drilling a hole in the surface at the hole mark so that the hole is normal to the surface of the object.

2. The method of claim 1, further comprising:

projecting a strobe light onto the surface of the object to assist in identifying a location of the surface mark on the surface.

3. The method of claim 2, further comprising:

producing a visual image of the hole mark illuminated by the strobe light by a camera directed at the hole mark.

4. The method of claim 1, wherein:

obtaining an image comprises obtaining a pair of images;
analyzing a brightness of said images; and
controlling an exposure time for said images based on an emissivity of the object's surface.

5. The method of claim 1, further comprising:

the hole mark having a shape indicative of a parameter associated with the drilling.

6. The method of claim 1, further comprising:

the hole mark having a color indicative of a parameter associated with the drilling.

7. The method of claim 1, further comprising:

capturing a first image of the object's surface;
capturing a second image of the object's surface; and
using the first image and the second image to assist in aligning the drill over the hole mark.

8. The method of claim 1, further comprising:

measuring a distance between the drill and the object's surface.

9. The method of claim 1, further comprising:

the automatically orienting being performed continuously.

10. A method of determining the orientation of a portion of a contoured surface, the surface to be of an object, the method comprising:

projecting a pair of laser lines from a pair of laser projectors onto the portion of the contoured surface such that the laser lines form non-parallel lines on the surface adjacent a centerline of a spindle, with the spindle supporting a drilling tool in longitudinal alignment with the centerline of the spindle, a first one of the laser lines indicating a pitch error of the surface relative to a camera axis, and a second one of the laser lines indicating a roll error of the surface relative a camera axis, the first and second laser lines assisting in determining normality and elevation of the drilling tool relative to the surface;

using the camera to capture an image of the portion of the surface while the first and second laser lines are being projected onto the portion of the contoured surface; and using angular position information obtained from the image to determine a normality error of the contoured surface relative to the drilling tool positioned adjacent the contoured surface; and using the image to assist in positioning said drilling tool so that the normality error is removed and the drilling tool is positioned normal to said surface, and without the aid of a predetermined computer generated model of the surface.

11. The method of claim 10, wherein:

said projecting the first and second laser lines comprises projecting the first and second laser lines to form a crosshair on the surface;

the image is a first image; and capturing a second image of the portion of the contoured surface while the crosshair is disabled.

12. The method of claim 11, further comprising:

drilling a normal hole in the surface at the hole mark.

13. The method of claim 10, wherein:

the supporting said camera and said laser projectors such that said camera and said laser projectors are moved in accordance with movement of said spindle.

14. The method of claim 10, further comprising:

positioning a drill and drill bit adjacent a hole mark on the portion of the surface; and determining a distance between the drill and the portion of the surface using the image.

* * * * *